Feb. 18, 1936. W. LIEDLE 2,031,567
METHOD AND APPARATUS FOR MANUFACTURING PACKING
Filed Oct. 3, 1933
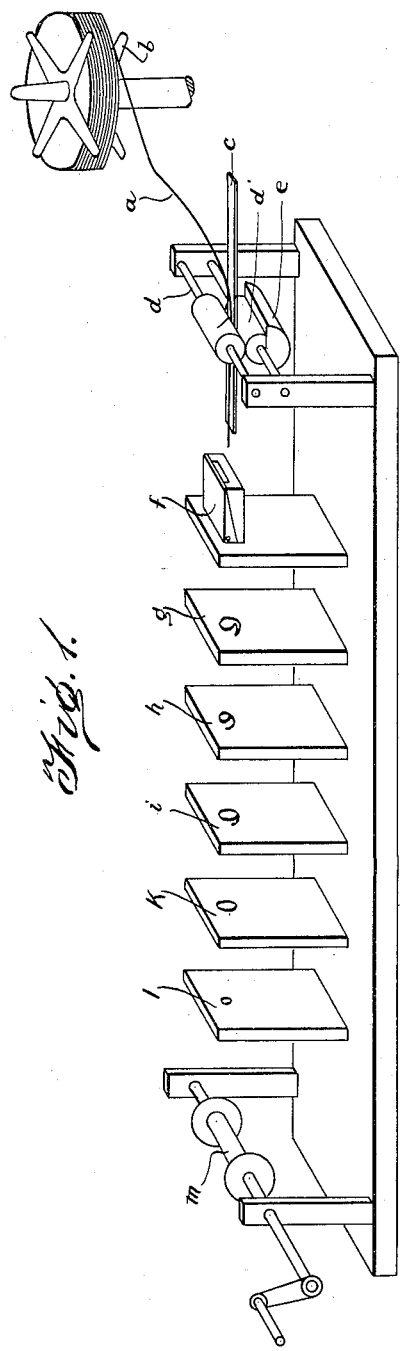
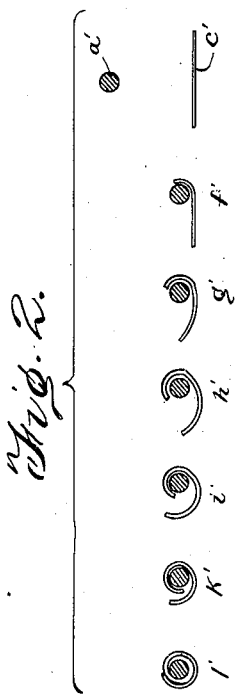
Inventor
Wilhelm Liedle
By Foster & Codier
Attorneys Patented Feb. 18, 1936

2,031,567

UNITED STATES PATENT OFFICE 2,031,567

METHOD AND APPARATUS FOR MANUFACTURING PACKING

Wilhelm Liedle, Stuttgart-Cannstatt, Germany, assignor to Firma Paul Lechler, Stuttgart, Germany Application October 3, 1933, Serial No. 691,984
In Switzerland October 24, 1932

5 Claims. (Cl. 153—1)

The present invention relates to improvements in or relating to metal covered packing cords, ropes or strands.

For packing stuffing boxes with packing cord and the like it is often necessary to employ metal covered packing cords and the like. These packing cords have been covered with metal strips which were wound spirally round the cord. The individual windings of the metal strip overlap one another somewhat and this gives rise to irregularities in the surface of the covered packing cord along the length thereof so that the packing properties of the cord are impaired.

It has also been proposed to manufacture packing rings and the like by bending the edges of an annular blank about an annular filling of packing material such as fibrous material or by introducing a filling or anti-friction metal and lubricant into a tubular metal covering.

It has also been proposed to make packing for glands or stuffing boxes by introducing into a metallic tube or within and between a series of two or more concentric metallic tubes a supporting packing or filling of fibrous or flexible material. Further it has been proposed to make flexible gasket strips by folding a strip of metal at right angles to its length about a cord or the like forming a core of fibrous material in such manner that the metal edges project laterally of the core to form a positioning web.

According to the present invention, I provide a method of manufacturing a metal covered packing cord, rope or strand in long continuous lengths characterized by wrapping a metal covering strip along its width about a cord, rope or strand at right angles to the axis of the latter to produce a completely wrapped metal covered packing of cord like form.

A preferred method of carrying out the invention comprises the steps of passing a cord or the like and a metal strip together longitudinally through a series of apertures which are so shaped and dimensioned that the metal strip is bent transversely round the cord or the like in stages into substantially tubular form to surround the cord or the like.

It will be understood that any suitable metal may be employed for the metal covering and that the cord rope, strand or the like may be made of any suitable material such for example as asbestos, hemp or tow.

In order that the invention may be well understood I will now describe by way of example only a preferred method of manufacturing an improved packing cord according to the invention and reference will be made to the accompanying drawing in which:

Figure 1 is a perspective diagrammatic view of one form of apparatus for use in making a metal covered packing cord.

Figure 2 shows in cross section successive stages in the wrapping of the metal strip about the cord.

Referring to the drawing a packing cord $a$ which is unwound from a supply spool $b$ is passed together with a metal strip $c$ between a pair of rollers $d$, $d'$, the lower one $d'$ of which runs in an oil bath $e$. The cord $a$ and strip $c$ are then passed together through an aperture $f$ which is so shaped as to bend the strip transversely round the cord $a$ to the cross section shown at $f'$ in Figure 2. The cord $a$ and strip $c$ are then passed in succession through the aligned apertures $g$, $h$, $i$, $k$, $l$, whereby the strip $c$ is progressively rolled about the cord $a$, so that these have successively the cross sections $a'$, $c'$ and then those shown at $f'$, $g'$, $h'$, $i'$, $k'$, $l'$ shown in Figure 2. The cord $a$ and strip $c$ are first passed by hand through the apertures. After they have acquired the section $l'$ by being passed through the final aperture the metal covered cord can be secured to a take up spool $m$ which, upon being rotated, continuously draws the cord $a$ and strip $c$ through the apertures whereby the strip is wrapped round the cord transversely of the width of the strip and at right angles to the axis of the cord.

The metal strip $c$ is preferably smooth metal foil such as lead foil, or a foil of lead alloy, tin foil or alloy of tin, or foil of other soft pliable metal. The cord or core $a$ of fibrous material may be twisted or untwisted before being fed into the apparatus. The cord $a$ is preferably impregnated with a lubricant, for example a petroleum lubricant or other suitable lubricant. The narrow strip of metal or metal foil is utilized in forming packing according to the invention and may be conveniently fed to the rollers $d$, $d'$ from a wound roll of long narrow metal strip.

In the finished packing the metal strip is closely wound around the strand or strands of fibrous material $a$, so that the finished packing does not contain void spaces; and one of the longitudinal edges of the metal band or strip lies within the rolled strip of metal adjacent the core of fibrous material, and the other edge of the band or strip of metal laps over the formed convolution or convolutions of metal. It will be observed that the width of the metal strip is perpendicular to the axis of the fibrous core when it is being wound around the latter, and the same relationship exists in the finished product.

The number of dies *f, g, h, i, k* and *l* and the shapes and dimensions of the openings therein may be so chosen as to wind the metal strip one or more times around the core of fibrous material.

Having now particularly described and ascertained the nature of my said invention and in what manner the same is to be performed, I declare that what I claim is:

1. The process of forming packing from soft, flexible fibrous core material and thin soft metal strip which comprises placing the longitudinal axis of an elongated body of soft, flexible fibrous core material substantially parallel with the longitudinal axis of a strip of thin soft metal, with the elongated body of core material substantially nearer one edge of the thin metal strip than the other edge and with the elongated body of core material in close relation with the thin metal strip, and while the said thin metal strip and body of fibrous core material are in said relative position, imparting lengthwise motion to them in the same direction, and during such motion, at a plurality of points along the length of the body of fibrous core material and thin metal strip, winding in stages the metal strip as an envelope a plurality of times about the body of fibrous core material with the width of the thin metal strip substantially perpendicular to the longitudinal axis of the body of fibrous core material, the winding at each of said aforementioned points only partially winding the said strip of metal about the body of fibrous core material, but winding at sufficient points being performed to wind the metal strip a plurality of times about the body of fibrous core material.

2. Apparatus for forming packing from thin soft metal strip and elongated soft core material which comprises the combination of means for imparting lengthwise motion to the thin soft metal strip and elongated soft core material while their longitudinal axes are substantially parallel to each other and the thin metal strip and core material are in close relation to each other, means for positioning the elongated soft core material lengthwise of the thin metal strip nearer one edge of the thin metal strip than the other edge to produce a wider portion of metal strip on one side of the core material, a plurality of means for thereafter winding in stages said wider portion of metal strip about the core material as an envelope, with the width of the metal strip substantially perpendicular to the longitudinal axis of the core material, each of said winding means contributing only to the partial surrounding of the core material by the said metal strip, and said winding means being present in sufficient number to cause the gradual and complete envelopment of the core material by a plurality of windings of the thin metal strip.

3. Apparatus for forming packing from thin soft metal strip and elongated soft core material which comprises the combination of means for imparting lengthwise motion to the thin soft metal strip and elongated soft core material with their longitudinal axes substantially parallel to each other and while the thin metal strip and soft core material are in close relationship to each other, means for positioning said core material nearer one edge of the thin metal strip than the other edge to form a wider portion of metal strip on one side of the core material, a plurality of die means, operating thereafter successively on the thin metal strip and core material during their said motion, for winding in stages the said wider portion of metal strip as an envelope about the core material with the width of the metal strip substantially perpendicular to the longitudinal axis of the core material, each of said die means contributing only to the partial surrounding of the core material by the metal strip, said plurality of die means being present in sufficient number to cause the gradual and complete envelopment of the core material by a plurality of windings of the said thin metal strip, and means for lubricating the surface of the thin metal strip exposed for contact with said die means.

4. Apparatus for forming packing from thin soft metal strip and elongated soft core material which comprises the combination of means for imparting lengthwise motion to the thin soft metal strip and elongated soft core material with their longitudinal axes substantially parallel to each other and while the thin metal strip and soft core material are in close relationship to each other, means for positioning said core material nearer one edge of the thin metal strip than the other edge to form a wider portion of metal strip on one side of the core material, a plurality of die means, operating thereafter successively on the thin metal strip and core material during their said motion, for winding in stages the said wider portion of metal strip as an envelope about the core material with the width of the metal strip substantially perpendicular to the longitudinal axis of the core material, each of said die means contributing only to the partial surrounding of the core material by the metal strip, said plurality of die means being present in sufficient number to cause the gradual and complete envelopment of the core material by a plurality of windings of the said thin soft metal strip.

5. The process of forming packing from soft, flexible, fibrous core material and thin soft metal strip which comprises placing the longitudinal axis of an elongated body of soft, flexible, fibrous core material substantially parallel with the longitudinal axis of a strip of thin soft metal and with the elongated body of core material in close relation with the said metal strip, and while the said thin metal strip and body of fibrous core material are in said relative position, imparting lengthwise motion to them in the same direction, and during such motion, at a plurality of points along the length of the body of fibrous core material and thin metal strip, winding in stages the metal strip as an envelope about the body of fibrous core material with the width of the thin metal strip substantially perpendicular to the longitudinal axis of the body of fibrous core material, the winding at each of said aforementioned points only partially winding the said strip of metal about the body of fibrous core material, but winding at sufficient points being performed to accomplish complete envelopment of the body of fibrous core material by the thin metal strip.

WILHELM LIEDLE.